United States Patent
Byun et al.

(10) Patent No.: US 10,312,497 B2
(45) Date of Patent: Jun. 4, 2019

(54) RECHARGEABLE BATTERY

(71) Applicant: SAMSUNG SDI CO., LTD., Yongin-si, Gyeonggi-do (KR)

(72) Inventors: Sangwon Byun, Yongin-si (KR); Yongchul Seo, Yongin-si (KR); Seungho Kwak, Yongin-si (KR); Sangkyoon Park, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 602 days.

(21) Appl. No.: 14/994,248

(22) Filed: Jan. 13, 2016

(65) Prior Publication Data

US 2017/0054136 A1   Feb. 23, 2017

(30) Foreign Application Priority Data

Aug. 17, 2015 (KR) ......................... 10-2015-0115526

(51) Int. Cl.
*H01M 2/34* (2006.01)
*H01M 2/26* (2006.01)
*H01M 2/22* (2006.01)

(52) U.S. Cl.
CPC ............... *H01M 2/34* (2013.01); *H01M 2/22* (2013.01); *H01M 2/263* (2013.01); *H01M 2200/103* (2013.01)

(58) Field of Classification Search
None
See application file for complete search history.

(56) References Cited

U.S. PATENT DOCUMENTS

| | | | |
|---|---|---|---|
| 2011/0305928 A1* | 12/2011 | Kim | H01M 2/34 429/61 |
| 2012/0282502 A1 | 11/2012 | Kim | |
| 2013/0136960 A1 | 5/2013 | Guen | |
| 2014/0255735 A1* | 9/2014 | Guen | H01M 2/348 429/61 |
| 2014/0315054 A1 | 10/2014 | Han | |
| 2015/0044526 A1 | 2/2015 | Guen et al. | |

FOREIGN PATENT DOCUMENTS

| | | |
|---|---|---|
| KR | 10-2012-0124026 A | 11/2012 |
| KR | 10-2013-0058588 A | 6/2013 |
| KR | 10-2014-0125657 A | 10/2014 |
| KR | 10-2015-0018344 A | 2/2015 |

* cited by examiner

*Primary Examiner* — Jonathan Crepeau
(74) *Attorney, Agent, or Firm* — Lee & Morse, P.C.

(57) ABSTRACT

A rechargeable battery includes an electrode assembly in a case, a terminal which passes through and protrudes from a cap plate, and a current collector plate in the case. The current collector plate electrically connects the electrode assembly and the terminal portion. The current collector plate has a fuse area which includes a fuse hole having a substantially elongated shape with round sides oriented in a widthwise direction of the current collector plate.

17 Claims, 5 Drawing Sheets

RECHARGEABLE BATTERY

CROSS-REFERENCE TO RELATED APPLICATION

Korean Patent Application No. 10-2015-0115526, filed on Aug. 17, 2015, and entitled, "Rechargeable Battery," is incorporated by reference herein in its entirety.

BACKGROUND

1. Field

One or more embodiments described herein relate to a rechargeable battery.

2. Description of the Related Art

Unlike a primary battery, a secondary battery is rechargeable. A low-capacity secondary battery may use a single battery cell in a battery pack to power cellular phones, camcorders, and other small-sized, portable electronic devices. A large-capacity secondary battery may use a plurality of battery cells in a battery pack to power driving motors of hybrid vehicles.

A rechargeable battery has various shapes (e.g., cylindrical or prismatic shapes) and may include an electrode assembly formed from a separator between a positive and negative electrode plates. The electrode assembly is included in a case along with an electrolyte, and a cap plate is installed in the case. Positive and negative electrode terminals are electrically connected to the electrode assembly and are exposed along or protrude from the cap plate.

During operation, a rechargeable battery may explode or ignite due to an increase in internal pressure when the battery is damaged or subject to an external short-circuit, overcharge, and/or penetration condition.

SUMMARY

In accordance with one or more embodiments, a rechargeable battery includes an electrode assembly in a case; a terminal which passes through and protrudes from a cap plate; and a current collector plate in the case and electrically connecting the electrode assembly and the terminal portion, wherein the current collector plate has a fuse area which includes a fuse hole having a substantially elongated shape with round sides oriented in a first direction of the current collector plate. Each of the round sides may have a radius substantially equal to or greater than half a length of the fuse hole in a second direction crossing the first direction.

In accordance with one or more other embodiments, a rechargeable battery includes an electrode assembly in a case; a terminal passing through and protruding from a cap plate; and a current collector plate in the case and electrically connecting the electrode assembly and the terminal portion, wherein the current collector plate has a fuse area that includes a fuse hole without corners, the fuse hole passing through the current collector plate. The fuse hole may have a substantially circular or oval shape elongated in a first direction of the current collector plate.

The fuse hole may have a first side, a second side, a first round side, and a second round side, the first side may face the second side, the first side and the second side may be substantially parallel to a first direction of the current collector plate, the first round side may face the second round side, and the first round side and the second round side may be connected to ends of the first side and the second side.

Each of the first round side and the second round side may have a radius substantially half a length of the fuse hole, and the length of the fuse hole in a second direction may have a shortest distance between the first side and the second side. Each of the first round side and the second round side may have a substantially oval shape elongated in a first direction of the current collector plate.

A short-axis radius of each of the first round side and the second round side may be substantially equal to half a length of the fuse hole in a second direction, and the length of the fuse hole in the second direction may have a shortest distance between the first side and the second side.

A long axis radius of each of the first round side and the second round side may be greater than half a length of the fuse hole in the second direction and may be equal to or less than half a width of the fuse hole in the first direction. The long axis of each of the first round side and the second round side may be substantially parallel to the width of the fuse hole in the first direction and a short axis may be substantially parallel to the length of the fuse hole in the second direction.

In accordance with one or more other embodiments, a current collector plate includes a bent area; a terminal area; and a fuse area including a fuse hole between the terminal area and the bent area, wherein the fuse hole has a width greater than a length and curved ends adjacent respective edges of the current collector plate, the width of the fuse hole corresponding to a distance between the curved ends. The curved ends may be spaced from the edges of the current collector plate by substantially equal amounts.

The fuse hole may have a substantially oval shape. The fuse hole may have a shape with substantially parallel sides between the curved ends. Each of the curved ends may correspond to a circle having substantially a same radius. The radius may be substantially equal to or greater than a predetermined fraction of a length of the fuse hole. The predetermined fraction may be half.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1A:
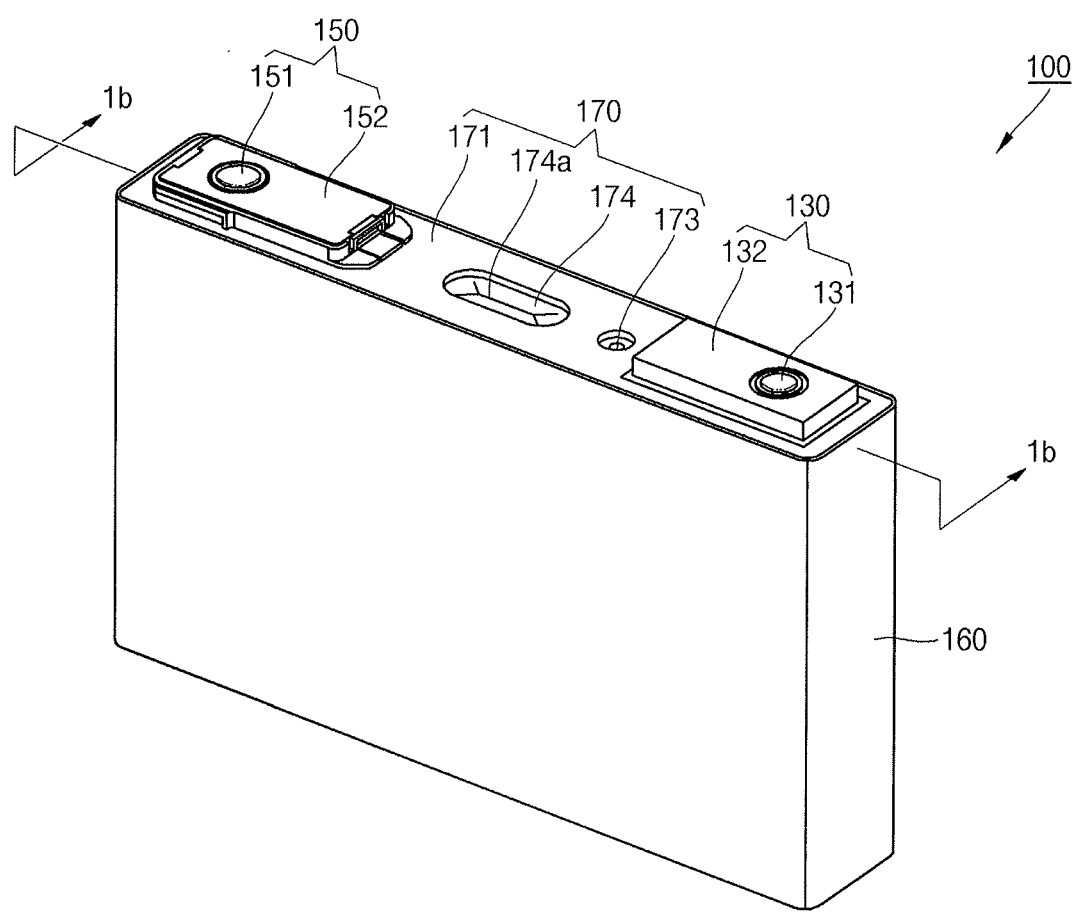
FIG. 1A illustrates an embodiment of a rechargeable battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1B:
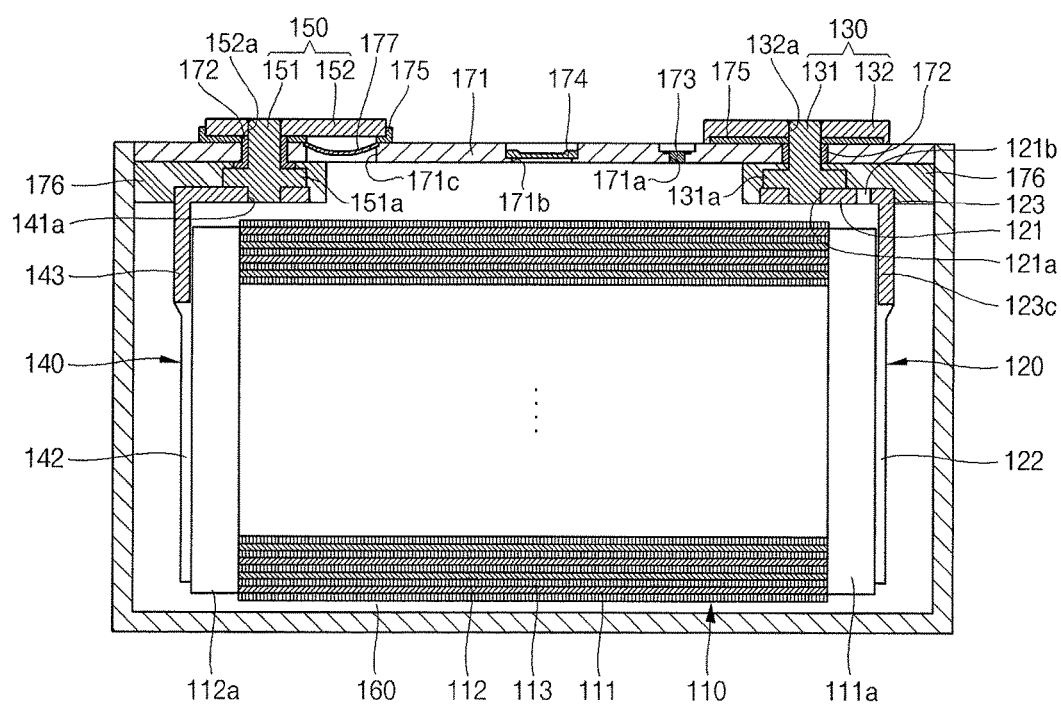
FIG. 1B illustrates a cross-section of the battery in FIG. 1A.

FIG. 1A illustrates an embodiment of a rechargeable battery 100, and FIG. 1B illustrates a sectional view taken along line 1b-1b in FIG. 1A. As illustrated in FIGS. 1A and 1B, the rechargeable battery 100 includes an electrode assembly 110, a first current collector plate 120, a first terminal unit 130, a second current collector plate 140, a second terminal unit 150, a case 160 and a cap assembly 170. In one embodiment, the rechargeable battery 100 may include a plurality of rechargeable batteries connected to each other in series to constitute a large-capacity battery pack for outputting a high or otherwise predetermined voltage.

The electrode assembly 110 may be formed, for example, by winding or laminating a stack of a first electrode plate 111, a separator 113, and a second electrode plate 112. The first electrode plate 111 may be a positive electrode and the second electrode plate 112 may be a negative electrode.

The first electrode plate 111 may be formed, for example, by coating a first electrode active material (e.g., a transition metal oxide) on a first electrode current collector formed of a metal foil, e.g., aluminum. The first electrode plate 111 includes a first electrode uncoated portion 111a that is a portion of the first electrode plate 111 having no first electrode active material coated thereon. The first electrode uncoated portion 111a forms a path for the flow of electric current between the first electrode plate 111 and an area outside of the first electrode plate 111. In another embodiment, the first electrode plate 111 may have a different structure and/or may be formed using different materials.

The second electrode plate 112 may be formed, for example, by coating a second electrode active material (e.g., graphite or carbon) on a second electrode current collector formed of a metal foil, e.g., nickel or copper foil. The second electrode plate 112 includes a second electrode uncoated portion 112a that is a portion of the second electrode plate 112 having no second electrode active material coated thereon. The second electrode uncoated portion 112a becomes a path for the flow of current between the second electrode plate 112 and outside of the second electrode plate 112. In another embodiment, the second electrode plate 112 may have a different structure and/or may be formed using different materials.

The separator 113 is positioned between the first electrode plate 111 and the second electrode plate 112, to prevent an electric short-circuit therebetween and to allow lithium ions to move therebetween. The separator 113 may include polyethylene, polypropylene a composite film thereof, or another material.

A first current collector plate 120 and a second current collector plate 140 are adjacent ends of the electrode assembly 110 and are electrically coupled to the first electrode plate 111 and the second electrode plate 112, respectively. The first current collector plate 120 and the second current collector plate 140 may be respectively coupled to the first electrode uncoated portion 111a and the second electrode uncoated portion 112a at corresponding ends of the electrode assembly 110.

The electrode assembly 110 is accommodated in the case 160 with an electrolyte. In one example embodiment, the electrolyte is prepared by dissolving a lithium salt, such as $LiPF_6$ or $LiBF4$ in an organic solvent, such as ethylene carbonate (EC), propylene carbonate (PC), diethyl carbonate (DEC), ethyl methyl carbonate (EMC), or dimethyl carbonate (DMC). In one or more embodiments, the electrolyte may be in a liquid, solid, or gel phase.

Figure 2A:
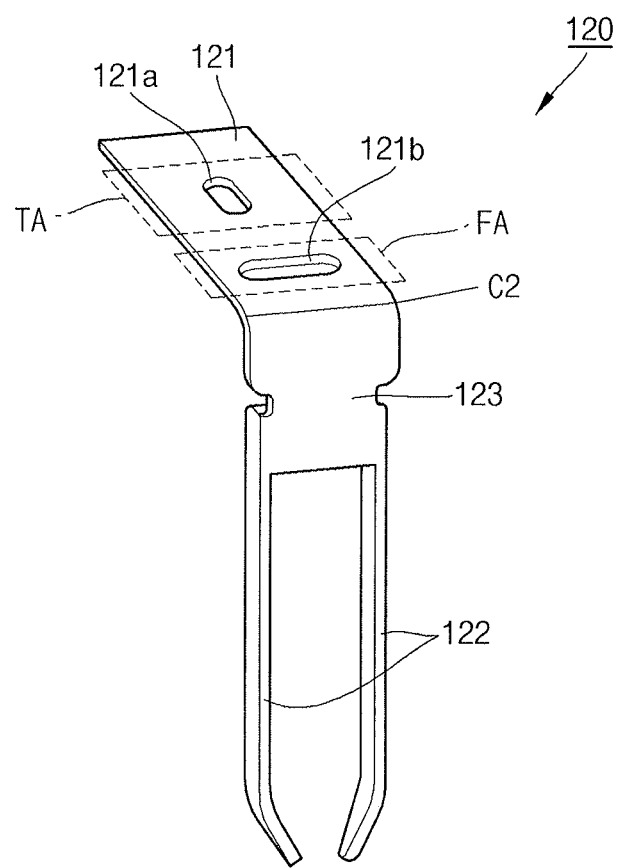
FIG. 2A illustrates an embodiment of a current collector plate in FIG. 1A.
Figure 2B:
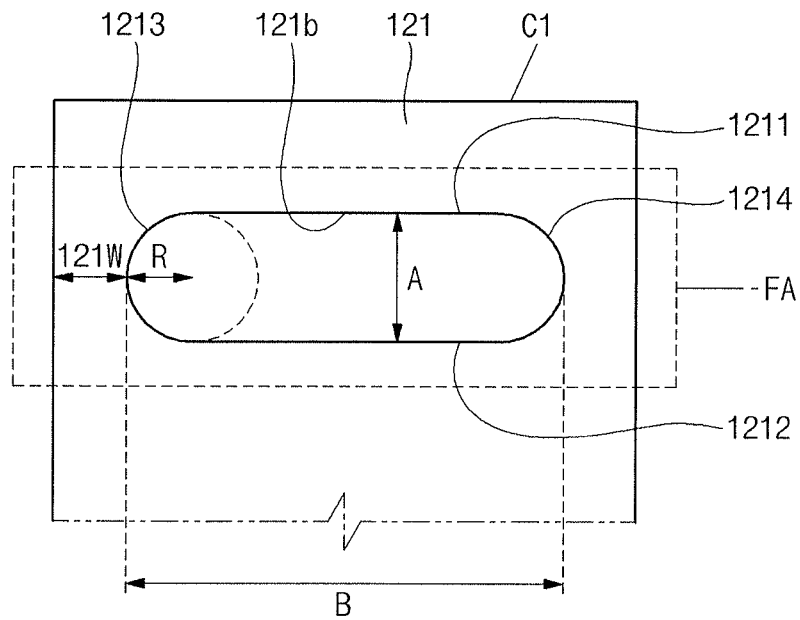
FIG. 2B illustrates an example of a fuse area of the current collector plate.

FIG. 2A is an enlarged sectional view illustrating a current collector plate (e.g., the first current collector plate 120) of FIG. 1A, and FIG. 2B is an enlarged plan view illustrating a fuse area FA of the first current collector plate 120 of FIG. 2A.

Referring to FIGS. 1A, 1B, 2A and 2B, the first current collector plate 120 includes a first electrode connecting part 122 connected to the first electrode plate 111, a first terminal connecting part 121 connected to the first terminal unit 130, and a first connecting part 123 connecting the first electrode connecting part 122 and the first terminal connecting part 121. The first current collector plate 120 is formed in a single unit. The first current collector plate 120 has a first corner part C1 bent between the first terminal connecting part 121 and the first connecting part 123, and may have substantially an 'L' shaped. The first current collector plate 120 may include a conductive material, e.g., aluminum or an aluminum alloy.

The first terminal connecting part 121 is connected (e.g., welded) to the first terminal unit 130, and is installed between a cap plate 171 of the cap assembly 170 and the electrode assembly 110 in the form of a plate lying in substantially a first (e.g., horizontal) direction. A first fastening hole 121a passing through a top surface and a bottom surface of the first terminal connecting part 121 and a first fuse hole 121b are formed in the first terminal connecting part 121. The first fuse hole 121b may reduce the sectional area of the first terminal connecting part 121 of the first current collector plate 120.

A first fastening terminal 131 of the first terminal portion 130 is fitted into the first fastening hole 121a and then is engaged with the first fastening hole 121a. The first fastening hole 121a may be sized to correspond to the first fastening terminal 131 to accommodate the first fastening terminal 131. The first fastening hole 121a is formed at one side of the first terminal connecting part 121, e.g., at a first terminal area TA. The first terminal area TA is spaced from a first corner part C1 of the first terminal connecting part 121.

The fuse hole 121b is in the fuse area FA of the first terminal connecting part 121. The fuse area FA is in a region of the first terminal connecting part 121 close to the first corner part C1, so as not to overlap the first terminal area TA. A region of the first terminal connecting part 121, where the fuse hole 121b is formed, may have a smaller sectional area than the other area of the first terminal connecting part 121. Therefore, the fuse area FA which includes the fuse hole 121b may have a relatively high resistance value in the first terminal connecting part 121.

The fuse hole 121b may have, for example, an elongated circular shape that is elongated in a first (e.g., widthwise) direction of the first terminal connecting part 121. The widthwise direction may be a widthwise direction of the first current collector plate 120, which is parallel with the first corner part C1. The fuse hole 121b has a first side 1211 and a second side 1212 parallel to the widthwise direction, and a first round side or end 1213 and a second round side or end 1214 connecting opposite ends of the first side 1211 and the second side 1212. The first round side 1213 may face the second round side 1214, and the first side 1211 may face the second side 1212.

The length A of the fuse hole 121b may be the shortest distance between the first side 1211 and the second side 1212. The length A of the fuse hole 121b may correspond, for example, to a length in a second direction crossing (e.g., perpendicular to) the first (e.g., widthwise) direction of the first current collector plate 120, which is the shortest distance in the fuse hole 121b. The width B of the fuse hole 121b may correspond, for example, to a longest distance between the first round side 1213 and the second round side 1214. The radius R of each of the first round side 1213 and the second round side 1214 may have a semi-circular shape and may be a fraction (e.g., half or another amount) of the length A of the fuse hole 121b.

The fuse width 121W corresponds, for example, to the width of each of the opposite sides in the fuse area FA including the fuse hole 121b. For example, the fuse width 121W may correspond to the width of a narrowest portion of the fuse area FA, and fuse widths 121W of opposite sides of the fuse area FA may be equal to each other.

Figure 3:
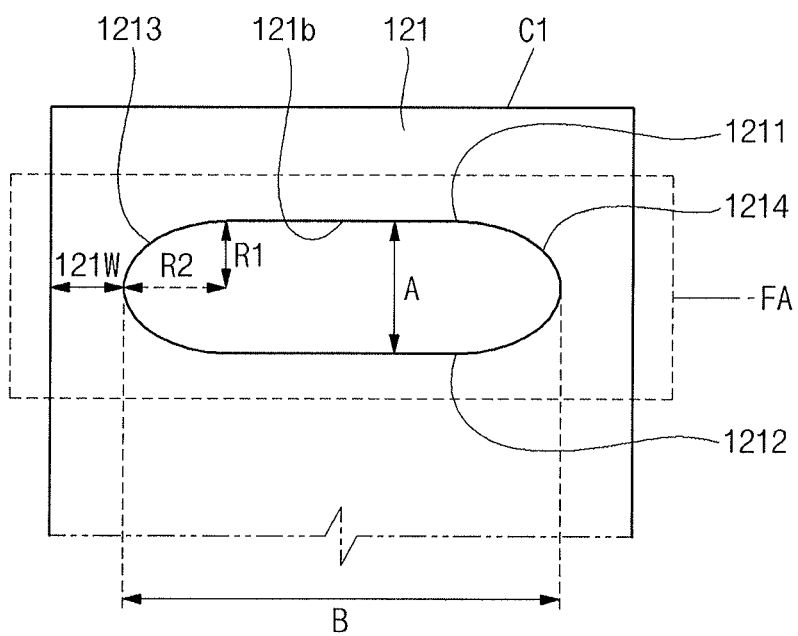
FIG. 3 illustrates another example of a fuse area of the current collector plate.

As illustrated in FIG. 3, the first round side 1213 and the second round side 1214 of the fuse hole 121b may be oval-shaped. For example, the first round side 1213 and the second round side 1214 may have a shape of an oval elongated in a lengthwise direction of a current collector plate. Thus, a short axis of each of the first round side 1213 and the second round side 1214 may be parallel with the length A of the fuse hole 121b. A long axis of each of the first round side 1213 and the second round side 1214 may be parallel with the width B of the fuse hole 121b.

In addition, the short-axis radius R1 of each of the first round side 1213 and the second round side 1214 may be equal to a predetermined fraction (e.g., half or another amount) of the length A of the fuse hole. A long-axis radius R2 of each of the first round side 1213 and the second round side 1214 may be greater than a predetermined fraction (e.g., half or another amount) of the length A of the fuse hole 121b and equal to or smaller than a predetermined fraction (e.g., half or another amount) of the width B of the fuse hole 121b.

If the long-axis radius R2 of each of the first round side 1213 and the second round side 1214 is equal to half the width B of the fuse hole 121b, the fuse hole 121b may have a widthwise elongated oval shape. The long-axis radius R2 may be parallel with the width B of the fuse hole 121b, and the short-axis radius R1 may be parallel with the length A of the fuse hole 121b. The fuse hole 121b may have another shape different from those described above. In one embodiment, in order to provide the same high-current fusing characteristic, the fuse width 121W may be at a constant level.

Figure 4:
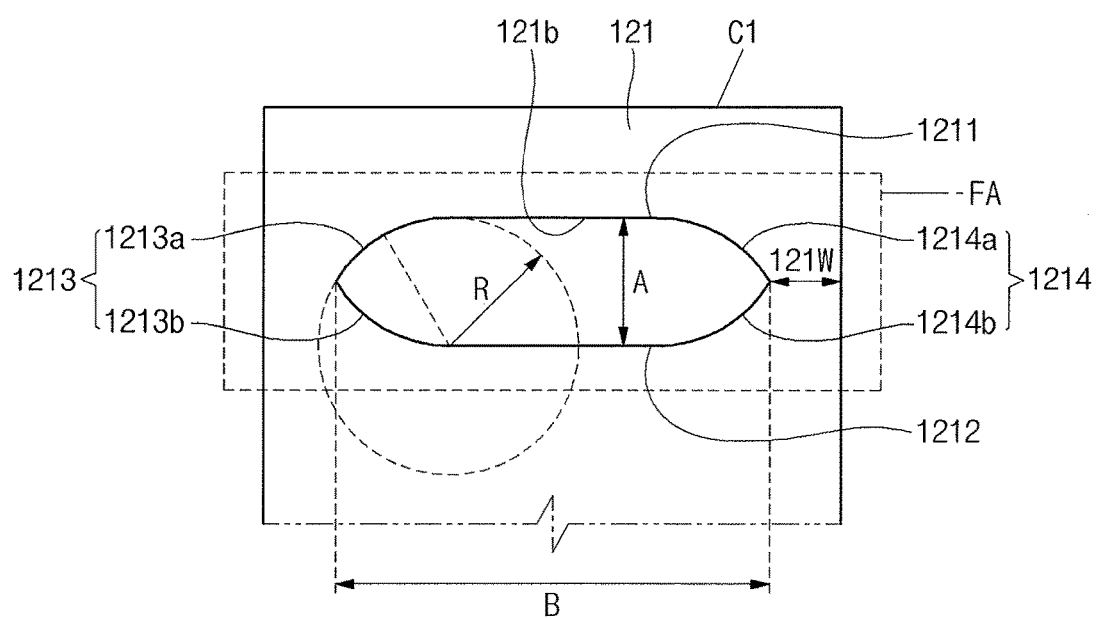
FIG. 4 illustrates another example of a fuse area of the current collector plate.

As illustrated in FIG. 4, the fuse hole 121b may have an elongated rectangular shape having four curved or round sides. The first round side 1213 may be formed such that two adjacent round sides 1213a and 1213b overlap each other.

The second round side 1214 may be formed such that two adjacent round sides 1214a and 1214b overlap each other. The four round sides may have the same or different radii.

In one embodiment, the radius R of each of the four round sides may be equal to or greater than a predetermined fraction (e.g., half or another amount) of the length A of the fuse hole 121b. If the radius R of the round side 1213a is equal to half the length A of the fuse hole 121b, the fuse hole 121b in FIG. 4 may have the same shape as the fuse hole 121b in FIG. 2B. In another embodiment, the fuse hole 121b may have a different shape. In one embodiment, in order to provide the same high-current fusing characteristic, the fuse width 121W may be maintained at a constant level.

A low-current dissipating property may be improved by forming the fuse hole 121b in an elongated circle or oval shape without corners, in order to increase the area of a region other than the fuse area FA. Therefore, when the first current collector plate 120 is welded to the electrode assembly 110 and the first terminal unit 130, the fuse area FA may not be damaged as a result of welding fatigue.

The first electrode connecting part 122 may be brought into contact with the first electrode uncoated portion 111a protruding to one end of the electrode assembly 110, and may then be electrically connected to the first electrode plate 111. The first electrode connecting part 122 is welded to the first electrode uncoated portion 111a and is configured to stand in a vertical direction. The first electrode connecting part 122 may include a number of first electrode connecting parts, which may correspond, for example, to the number of electrode assemblies 110 in the case 160. The first electrode connecting parts 122 may be welded to the first electrode uncoated portion 111a of the electrode assemblies 110. An example of two of the first electrode connecting parts 122 is illustrated in FIG. 2A. The first electrode connecting parts 122 may have a different arrangement in another embodiment.

One side of the first connecting part 123 is connected to the first electrode connecting part 122. The other side of the first connecting part 123 is connected to the first terminal connecting part 121. The first connecting part 123 may have a plate shape vertically extending from a top end of the first electrode connecting part 122. The first connecting part 123 is between a side surface of the case 160 and the electrode assembly 110. The first terminal connecting part 121 and the first connecting part 123 may be oriented in different directions (e.g., perpendicular to each other) around the first corner part C1 where the first terminal connecting part 121 and the first connecting part 123 meet each other.

The first terminal unit 130 may be of a metal or an equivalent thereof and may be electrically connected to the first current collector plate 120. The first terminal unit 130 includes a first fastening terminal 131 in the first fastening hole 121a of the first current collector plate 120 and a first electrode terminal 132 coupled to the first fastening terminal 131.

The first fastening terminal 131 passes through the cap plate 171 and then upwardly extends and protrudes a predetermined length. The first fastening terminal 131 is electrically connected to the first current collector plate 120 under the cap plate 171. The first fastening terminal 131 extends and protrudes a predetermined length to an upper side of the cap plate 171. A flange 131a extends in a lateral direction to prevent the first fastening terminal 131 from being dislodged from the cap plate 171 and is under the cap plate 171. A lower region of the flange 131a in the first fastening terminal 131 may be fitted into the first fastening hole 121a of the first current collector plate 120, and may then be fastened, for example, by riveting or welding.

In addition, an upper region of the flange 131a in the first fastening terminal 131 may pass through the cap plate 171, and may then upwardly extend and protrude a predetermined length. The first electrode terminal 132 may be fixed to the extending and protruding region.

The first electrode terminal 132 may have a plate shape, and a first terminal hole 132a may pass through top and bottom surfaces of the first electrode terminal 132. The first terminal hole 132a of the first electrode terminal 132 may have a size and shape corresponding to the first fastening terminal 131, in a horizontal direction, to accommodate the first fastening terminal 131. The first fastening terminal 131 protrudes to the upper side of the cap plate 171 and may be fitted into the first terminal hole 132a in the first electrode terminal 132, and may then be fastened, for example, by riveting or welding.

The first terminal unit 130 may be electrically connected to the cap plate 171. The first terminal unit 130 may be made of, for example, aluminum, an aluminum alloy, or another material.

The second current collector plate 140 includes a second electrode connecting part 142 connected to the second electrode plate 112, a second terminal connecting part 141 connected to the second terminal unit 150, and a second connecting part 143 connecting the second electrode connecting part 142 and the second terminal connecting part 141. The second current collector plate 140 is formed in a single unit. The second current collector plate 140 has a second corner part C2 bent between the second terminal connecting part 141, and the second connecting part 143 may have substantially 'L' shape. The second current collector plate 140 may be made of one or more conductive materials, e.g., copper, a copper alloy, or an equivalent thereof.

The second current collector plate 140 may have substantially the same configuration as the first current collector plate 120 in FIG. 2A. However, the second current collector plate 140 may be configured such that the fuse hole 121b is not provided in the second terminal connecting part 141.

The second terminal unit 150 may be made of a metal or an equivalent thereof, and may be electrically connected to the second current collector plate 140. The second terminal unit 150 includes a second fastening terminal 151 in the second fastening hole 141a of the second current collector plate 140 and a second electrode terminal 152 coupled to the second fastening terminal 151.

The second fastening terminal 151 passes through the cap plate 171 and then upwardly extends and protrudes a predetermined length. The second fastening terminal 151 may be electrically connected to the second current collector plate 140 under the cap plate 171. A lower region of the flange 151a in the second fastening terminal 151 may be fitted into the second fastening hole 141a of the second collector plate 140, and may then be fastened, for example, by riveting or welding.

In addition, an upper region of the flange 151a in the second fastening terminal 151 passes through the cap plate 171 and then upwardly extends and protrudes a predetermined length, and the second electrode terminal 152 may be fixed to the extending and protruding region. The second terminal unit 150 may have substantially the same configuration as the first terminal unit 130.

The case 160 may be made of a conductive metal (e.g., aluminum, an aluminum alloy, nickel plated steel) and may have a substantially rectangular parallelepiped prismatic shape with an opening for receiving the electrode assembly 110, the first current collector plate 120, and the second current collector plate 140. Since the case 160 and the cap assembly 170 are coupled to each other as illustrated in FIGS. 1A and 1B, the opening is not illustrated but is a substantially opened portion at the periphery of the cap assembly 170. The internal surface of the case 160 is insulated from the electrode assembly 110, the first current collector plate 120, the second current collector plate 140, and the cap assembly 170.

The cap assembly 170 is coupled to the case 160. The cap assembly 170 may include the cap plate 171, a seal gasket 172, a plug 173, a safety vent 174, an upper insulation member 175, a lower insulation member 176, and a short-circuit plate 177.

The cap plate 171 seals the opening of the case 160 and, for example, may be made of the same material as the case 160. The cap plate 171 may be coupled to the case 160, for example, by laser welding. The cap plate 171 may be electrically connected to the first terminal unit 130, and the cap plate 171 may have the same polarity as the first terminal unit 130. Accordingly, the cap plate 171 and the case 160 may have the same polarity.

The seal gasket 172 is made of an insulating material and is formed between each of the first fastening terminal 131 and the second fastening terminal 151 and the cap plate 171 to seal spaces between the first fastening terminal 131, the second fastening terminal 151, and the cap plate 171. The seal gasket 172 prevents external moisture from permeating into the interior of the rechargeable battery 100 and/or prevents an electrolyte in the rechargeable battery 100 from flowing out.

The plug 173 seals an electrolyte injection hole 171a of the cap plate 171. The safety vent plate 174 is installed in a vent hole 171b of the cap plate 171 and has a notch 174a configured to be opened at a preset pressure.

The upper insulation member 175 is between the second electrode terminal 152 and the cap plate 171, and serves to electrically insulate the second electrode terminal 152 from the cap plate 171. The upper insulation member 175 makes close contact with the cap plate 171. The upper insulation member 175 may also make close contact with the seal gasket 172. The upper insulation member 175 insulates the second terminal unit 150 from the cap plate 171.

The upper insulation member 175 may also be between the first electrode terminal 132 and the cap plate 171. However, a portion of the first electrode terminal 132 may make contact with the cap plate 171 establish an electrical connection with the cap plate 171.

The lower insulation member 176 is between the first current collector plate 120 and the second current collector plate 140 and the cap plate 171 to prevent a short-circuit. For example, the lower insulation member 176 prevents a short-circuit between the first current collector plate 120 and the cap plate 171 and a short-circuit between the second current collector plate 140 and the cap plate 171. The lower insulation member 176 may also be between each of the first electrode terminal 132 and the second electrode terminal 152 and the cap plate 171 to prevent a short-circuit between each of the first electrode terminal 132 and the second electrode terminal 152 and cap plate 171.

The short-circuit plate 177 is between the upper insulation member 175 and the cap plate 171 in the short-circuit hole 171c of the cap plate 171. The short-circuit plate 177 may include a downwardly convex round portion and an inversion plate including a peripheral portion fixed to the cap plate 171. When internal pressure of the rechargeable battery 100 exceeds a preset pressure, for example, due to overcharging or another abnormal condition, the short-circuit plate 177 may invert and protrude to have an upwardly convex shape. When the short-circuit plate 177 assumes an upwardly convex shape, it contacts the second electrode terminal 152 to thereby induce a short-circuit. When a short-circuit is induced, a large amount of current flows to generate heat. A fuse function is performed (e.g., the fuse blows) when a region, having the fuse width 121W, in the fuse area FA that includes the fuse hole 121b in the first current collector plate 120, melts.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present embodiments as set forth in the following claims.

What is claimed is:

1. A rechargeable battery, comprising:
an electrode assembly in a case;
a terminal which passes through and protrudes from a cap plate; and
a current collector plate in the case and electrically connecting the electrode assembly and the terminal, wherein the current collector plate includes a bent area, a terminal area, and a fuse area between the bent area and the terminal area, the fuse area including a fuse hole without corners passing through the current collector plate, the fuse hole having a substantially elongated shape with round sides, and being elongated in a first direction of the current collector plate and perpendicular to a second direction of the current collector plate, the second direction being a direction between the bent area and the terminal area.

2. The battery as claimed in claim 1, wherein:
each of the round sides has a radius substantially equal to or greater than half a length of the fuse hole in the second direction.

3. A rechargeable battery, comprising:
an electrode assembly in a case;
a terminal passing through and protruding from a cap plate; and
a current collector plate in the case and electrically connecting the electrode assembly and the terminal, wherein the current collector plate has a fuse area that includes a fuse hole without corners, the fuse hole passing through the current collector plate, the fuse hole being elongated in a first direction of the current collector plate, the first direction being a direction between side edges of the current collector plate.

4. The battery as claimed in claim 3, wherein the fuse hole has a substantially circular or oval shape elongated in the first direction of the current collector plate.

5. The rechargeable battery as claimed in claim 3, wherein:
the fuse hole has a first side, a second side, a first round side, and a second round side,
the first side faces the second side,
the first side and the second side are substantially parallel to the first direction of the current collector plate,
the first round side faces the second round side, and
the first round side and the second round side are connected to ends of the first side and the second side.

6. The rechargeable battery as claimed in claim 5, wherein:
each of the first round side and the second round side has a radius substantially half a length of the fuse hole in a second direction the second direction being orthogonal to the first direction.

7. The rechargeable battery as claimed in claim 5, wherein each of the first round side and the second round side has a substantially oval shape elongated in a first direction of the current collector plate.

8. The rechargeable battery as claimed in claim 7, wherein:
a short-axis radius of each of the first round side and the second round side is substantially equal to half a length of the fuse hole in a second direction orthogonal to the first direction, and
the length of the fuse hole in the second direction is a shortest distance between the first side and the second side.

9. The rechargeable battery as claimed in claim 8, wherein:
a long axis radius of each of the first round side and the second round side is greater than half a length of the fuse hole in the second direction and is equal to or less than half a width of the fuse hole in the first direction.

10. The rechargeable battery as claimed in claim 9, wherein the long axis of each of the first round side and the second round side is substantially parallel to the width of the fuse hole in the first direction and a short axis is substantially parallel to the length of the fuse hole in the second direction.

11. A current collector plate, comprising:
a bent area;
a terminal area; and
a fuse area including a fuse hole without corners between the terminal area and the bent area, wherein the fuse hole has a width greater than a length and curved ends adjacent respective edges of the current collector plate, the width of the fuse hole corresponding to a distance between the curved ends.

12. The current collector plate as claimed in claim 11, wherein the curved ends are spaced from the edges of the current collector plate by substantially equal amounts.

13. The current collector plate as claimed in claim 11, wherein the fuse hole has a substantially oval shape.

14. The current collector plate as claimed in claim 11, wherein the fuse hole has a shape with substantially parallel sides between the curved ends.

15. The current collector plate as claimed in claim 11, wherein each of the curved ends corresponds to a circle having substantially a same radius.

16. The current collector plate as claimed in claim 15, wherein the radius is substantially equal to or greater than a predetermined fraction of a length of the fuse hole.

17. The current collector plate as claimed in claim 16, wherein the predetermined fraction is half.

* * * * *